Feb. 8, 1938.　　　　J. B. LESHER　　　　2,107,484
FOWL HOLDER
Filed Dec. 3, 1936　　　2 Sheets-Sheet 1

Inventor
J. B. Lesher
By L. F. Randolph
Attorney

Feb. 8, 1938.  J. B. LESHER  2,107,484
FOWL HOLDER
Filed Dec. 3, 1936   2 Sheets-Sheet 2
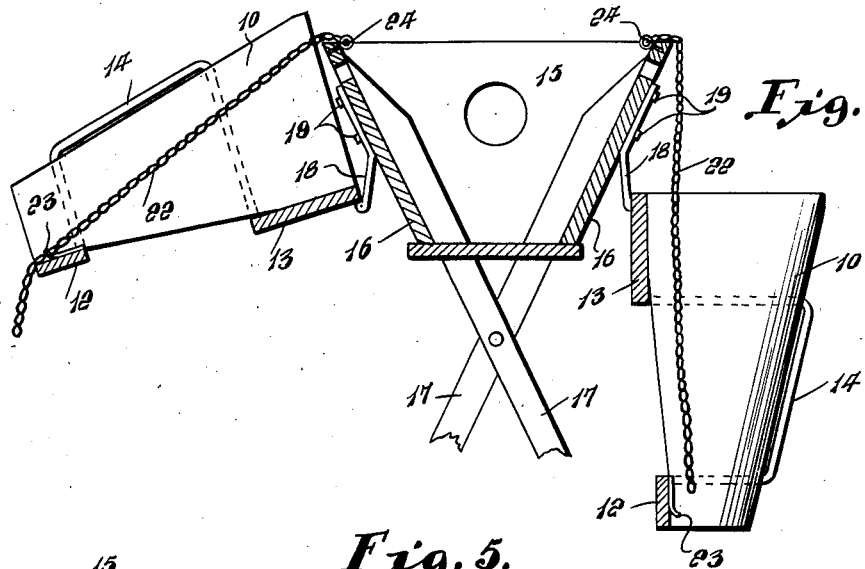
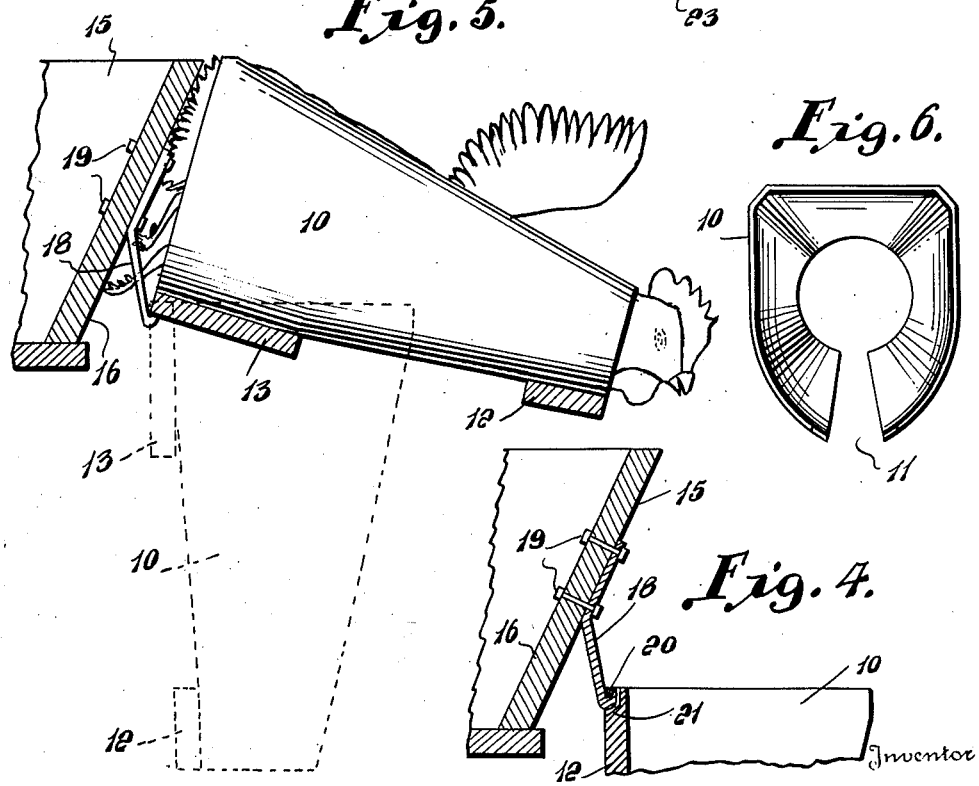
Inventor
J. B. Lesher Patented Feb. 8, 1938

2,107,484

UNITED STATES PATENT OFFICE 2,107,484

FOWL HOLDER

John B. Lesher, Chambersburg, Pa.

Application December 3, 1936, Serial No. 114,049

7 Claims. (Cl. 119—97)

This invention relates to a holder for fowl or poultry for use when they are to be held or confined in a certain position for a short time as for blood testing or vaccinating.

It is aimed to provide a construction and method wherein the fowl is placed in a frustoconical or funnel shaped holder having a longitudinal slot, preferably when the holder is vertical and which holder is thereafter moved to the horizontal and closed at the larger end, the wing or wings projecting through the slot and the head projecting beyond the smaller end of the holder. The fowl is held in the most advantageous position as a result, and without danger of escape or injury in an attempt so to do.

The more specific objects and advantages will become apparent from a consideration of the description following taken in connection with accompanying drawings illustrating an operative embodiment.

In said drawings:—

Figure 3 is a vertical sectional view taken on the line 3—3 of Figure 1;

Figure 4 is a vertical sectional view taken on the line 4—4 of Figure 1;

Figure 5 is a detail vertical sectional view showing a chicken held by the apparatus, and Figure 6 is an end view looking toward the larger end of a holder.

Figure 1:
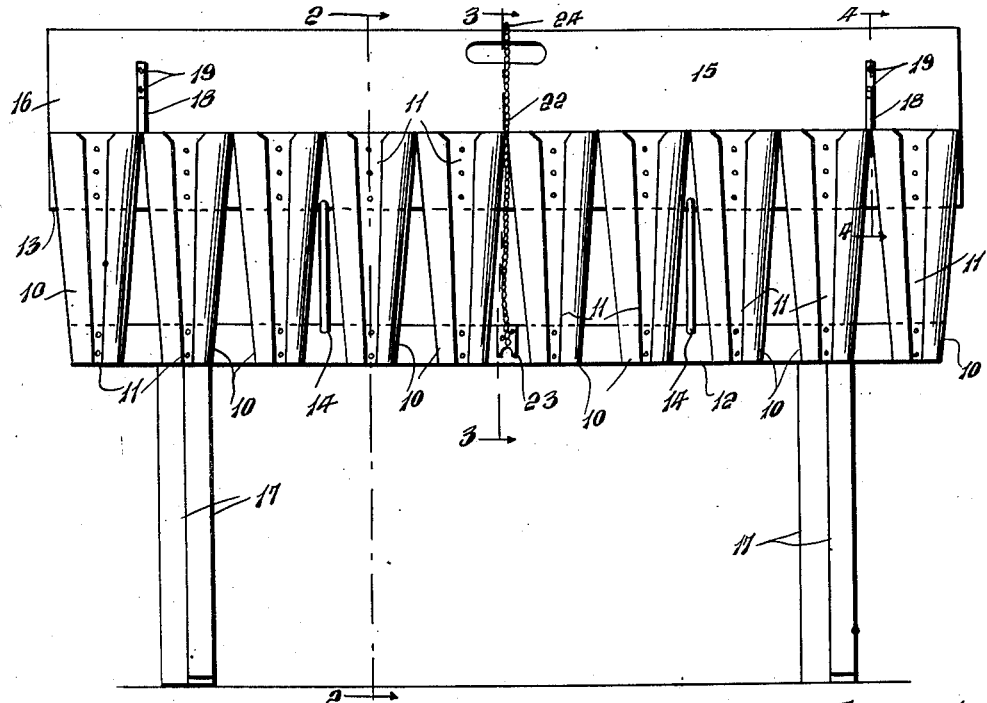
Figure 1 is a side elevation of a fowl holding apparatus constructed in accordance with the invention, the fowl holders being shown in vertical position.
Figure 2:
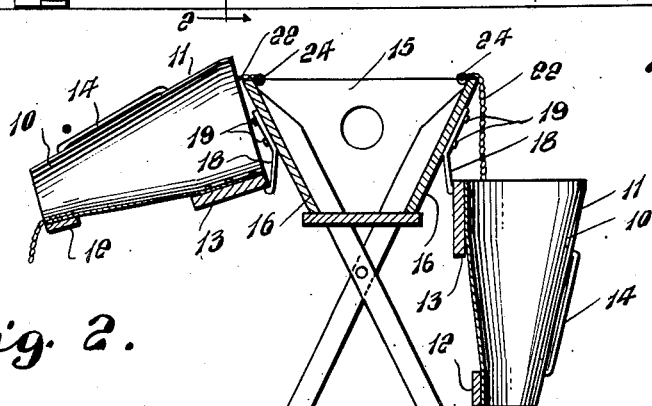
Figure 2 is a vertical sectional view taken on the line 2—2 of Figure 1.

Referring specifically to the drawings, a plurality of holders for fowl or poultry is shown as at 10. A single holder may be employed or a plurality as shown in the drawings. These holders consist of hollow bodies of funnel shape or frustoconical shape in as much as one end is larger than the other end. Such holders or bodies have longitudinally extending slots at 11 which are preferably slightly larger at the larger ends of the holders. The holders may be expeditiously stamped from sheet metal or made of any desired material and in any desired sizes.

A chicken, for example, is adapted to be thrust into the holder as suggested in Figure 5, with a wing or wings protruding through the slot 11 and with the head protruding beyond the smaller end of the holder, the feet extending beyond the larger end. The chicken is preferably placed in the holder when the latter is in a vertical position and thereafter, the holder is moved to a more nearly horizontal position as shown in the drawings, wherein means are provided for closing the rear end of the holder 10 or affording such an obstruction that the chicken cannot escape. In such position, the fowl may be readily operated upon as the part from which blood samples are usually taken protrude, namely the head or a wing.

Usually the holders 10 are employed in plurality of which are connected together by battens 12 and 13, or the equivalent. Handles 14 have opposite ends connected to the battens 12 and 13.

The units of the holders are preferably detachably connected to a suitable support to facilitate detachment in order to simultaneously release all of the chickens from the holders. Such a support, for example, may be a feed trough 15 having sides 16 and supported by legs as at 17. Pairs of hooks 18 are attached at 19 to the opposite walls 16 and the hooks are adapted for detachable engagement by lugs or the like 20, the batten 13 preferably being cutaway or having clearance as at 21 adjacent the lugs 20. Such lugs 20 and hooks not only permit detachable engagement of the units of holders but also form a hinge connection whereby the holders may be swung from a vertical position as shown in dotted lines in Figure 5, with a fowl therein, to the substantially horizontal position shown in full lines in the same figure, wherein the wall or walls 16 serve to close the rear ends of the holders or form such abutments that the chickens cannot escape or have such freedom of movement as will injure them in an attempt to escape.

The holders may be held in the raised or substantially horizontal position by any suitable means for instance by the engagement of a link of a chain 22, with a hook or projection 23 provided on the battens 12, such chain being attached or anchored as at 24 to the support or feed box 15.

The handles 14 may be grasped in raising and lowering the holder units and also in detaching the same from the hooks 18 and shaking the fowls from the holders.

Various changes may be resorted to provided they fall within the spirit and scope of the invention.

I claim as my invention:—

1. A fowl holder of the class described comprising a holder body open at both ends and smaller at one end and larger at the other end, said body having a longitudinally extending slot to accommodate protrusion of the wing of a fowl, in combination with means adapted to extend across the larger end of the holder to prevent escape of a fowl, said body and means being in relatively movable relation.

2. A fowl holder of the class described comprising a holder body open at both ends and smaller at one end and larger at the other end, said body having a longitudinally extending slot to accommodate protrusion of the wing of a fowl, a support, and means mounting the holder for movement relatively to the support whereby the latter will co-act with the larger end to prevent escape of a fowl.

3. A fowl holder of the class described comprising a holder body open at both ends and smaller at one end and larger at the other end, said body having a longitudinally extending slot to accommodate protrusion of the wing of a fowl, a support, and means pivotally and detachably connecting the holder to the support for movement to and from a vertical and a raised position, the support in the latter position co-acting with the larger end of the holder to prevent escape of a fowl.

4. A fowl holder of the class described comprising a holder body open at both ends and smaller at one end and larger at the other end, said body having a longitudinally extending slot to accommodate protrusion of the wing of a fowl, a support, means pivotally and detachably connecting the holder to the support for movement to and from a vertical and a raised position, the support in the latter position co-acting with the larger end of the holder to prevent escape of a fowl, in combination with means on the support detachably engageable with the holder to maintain the latter in raised position.

5. A fowl holder of the class described comprising a holder body open at both ends and smaller at one end and larger at the other end, said body having a longitudinally extending slot to accommodate protrusion of the wing of a fowl, a support, means pivotally and detachably connecting the holder to the support for movement to and from a vertical and a raised position, the support in the latter position co-acting with the larger end of the holder to prevent escape of a fowl, in combination with means on the support detachably engageable with the holder to maintain the latter in raised position, comprising a flexible element extending into said holder body and having a link, and a member on the interior of the holder body engageable by said link.

6. Apparatus of the class described comprising a support, hooks on said support, a batten having means pivotally and detachably engaging said hooks, and fowl holders connected to the batten and open at both ends, said holders through pivotal movement of the batten adapted for disposition relatively close at one end to the support to prevent escape of the fowl.

7. Apparatus of the class described comprising a support, hooks on said support, a batten having means pivotally and detachably engaging said hooks, fowl holders connected to the batten and open at both ends, said holders through pivotal movement of the batten adapted for disposition relatively close at one end to the support to prevent escape of the fowl, handle means extending from the batten, a flexible element connected to the support having a link, and means on the holder engageable by the link to maintain the latter raised.

JOHN B. LESHER.